(12) United States Patent
Oikawa (10) Patent No.: US 7,912,364 B2
(45) Date of Patent: Mar. 22, 2011

(54) OPTICAL OBSERVATION APPARATUS AND IMAGE-PICKUP APPARATUS

(75) Inventor: Makoto Oikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 219 days.

(21) Appl. No.: 12/142,492

(22) Filed: Jun. 19, 2008

(65) Prior Publication Data

US 2009/0034960 A1  Feb. 5, 2009

(30) Foreign Application Priority Data

Jun. 22, 2007  (JP) .................. 2007-165644

(51) Int. Cl.
  *G03B 13/02*  (2006.01)
(52) U.S. Cl. .................. 396/147; 396/150; 396/296
(58) Field of Classification Search .................. 396/373, 396/384, 385, 386; 359/197.1, 201.2, 203.1, 359/220.1, 212.2
See application file for complete search history.

(56) References Cited

U.S. PATENT DOCUMENTS

| | | | | |
|---|---|---|---|---|
| 5,489,965 A | * | 2/1996 | Mukai et al. | 396/296 |
| 5,604,554 A | * | 2/1997 | Kirigaya | 396/296 |
| 5,727,234 A | * | 3/1998 | Sakagami et al. | 396/52 |
| 5,754,900 A | * | 5/1998 | Suda | 396/296 |
| 6,021,006 A | * | 2/2000 | Nishio et al. | 359/819 |
| 6,023,365 A | * | 2/2000 | McDonald | 359/291 |
| 6,052,533 A | * | 4/2000 | Tamura et al. | 396/51 |
| 6,055,376 A | * | 4/2000 | Ohtaka et al. | 396/51 |
| 6,141,150 A | * | 10/2000 | Ushiyama et al. | 359/618 |
| 7,196,315 B2 | * | 3/2007 | Takahashi | 250/216 |
| 7,508,591 B2 | * | 3/2009 | Pinho | 359/634 |
| 2008/0174873 A1 | * | 7/2008 | Sumiyama et al. | 359/589 |

FOREIGN PATENT DOCUMENTS

| | | |
|---|---|---|
| JP | 07-244317 | 9/1995 |
| JP | 10-228057 | 8/1998 |
| JP | 2005-121732 | 5/2005 |

* cited by examiner

*Primary Examiner* — W. B. Perkey
*Assistant Examiner* — Linda B Smith
(74) *Attorney, Agent, or Firm* — Cowan, Liebowitz & Latman, P.C.

(57) ABSTRACT

The optical observation apparatus includes an optical element which reflects a first wavelength region light from an object to introduce the light to an eyepiece part, and a light source which emits a second wavelength region light. A wavelength-selective optical film which transmits the first wavelength region light and reflects the second wavelength region light is disposed inside the optical element. The optical observation apparatus superimposes an image formed by the second wavelength region light reflected by the wavelength-selective optical film on an object image formed by the first wavelength region light transmitted through the wavelength-selective optical film to cause an observer to observe the object image with the superimposed image through the eyepiece part. The optical observation apparatus can superimpose an optional image on the object image to enable the observer to observe these images without a deterioration of viewfinder performance.

6 Claims, 5 Drawing Sheets

OPTICAL OBSERVATION APPARATUS AND IMAGE-PICKUP APPARATUS

BACKGROUND OF THE INVENTION

The present invention relates to an optical observation apparatus which enables an observer to observe an object image formed by light from an object through an eyepiece part, and more particularly to an optical observation apparatus which has a superimpose display function of superimposing an image for displaying various pieces of information on the object image. The optical observation apparatus of the invention is suitably used as an optical viewfinder mounted on an image-pickup apparatus such as a video camera or a still camera.

The optical viewfinder of the image-pickup apparatus has the superimpose display function of superimposing information images of focus detection areas or photometry areas on the object image in a finder viewing field to enable observation of both the images in the same viewing field.

Optical viewfinders that have the superimpose display function are disclosed in Japanese Patent Laid-Open Nos. 7-244317, 10-228057, and 2005-121732.

The optical viewfinder disclosed in Japanese Patent Laid-Open No. 7-244317 includes a display part constituted by reflective surfaces on a focusing screen. This display part is illuminated with light from a light source disposed in an upper front of a penta-dach prism. The reflected light from the display part is guided through the penta-dach prism to an eyepiece lens.

The optical viewfinder disclosed in Japanese Patent Laid-Open No. 10-228057 includes a light combining means such as a dichroic film disposed between a penta-dach prism and an eyepiece lens. The light combining means synthesizes an object image formed on a focusing screen and an image of information displayed on a liquid crystal panel to be superimposedly observed through the eyepiece lens.

The optical viewfinder disclosed in Japanese Patent Laid-Open No. 2005-121732 includes a collective lens which collects a light flux from a light source, a scanning member which scans and reflects the light flux transmitted through the collective lens, and a microlens array disposed near a position where an image is formed by the collective lens. An information image (electronic image) is formed on the microlens array with the light flux scanned by the scanning member. A superimposing means (polarization beam splitter) disposed in a viewfinder optical path synthesizes the object image formed on the focusing screen and the information image formed on the microlens array to be superimposedly observed.

In the optical viewfinder disclosed in Japanese Patent Laid-Open No. 7-244317, however, the reflective surfaces are formed beforehand on the focusing screen to constitute the display part, only predetermined information can be displayed.

In the optical viewfinders disclosed in Japanese Patent Laid-Open Nos. 10-228057 and 2005-121732, the arrangement of the light combining means and the superimposing means between penta-dach prism and the eyepiece lens extends the viewfinder optical path, which may cause a deterioration of viewfinder performance such as a reduction of a viewfinder magnification.

BRIEF SUMMARY OF THE INVENTION

The present invention provides an optical observation apparatus which can superimpose an optional image on an object image to enable an observer to observe these images without the deterioration of viewfinder performance.

The present invention provides, according to an aspect thereof, an optical observation apparatus including an optical element which reflects a first wavelength region light from an object to introduce the light to an eyepiece part, and a light source which emits a second wavelength region light that is light in a wavelength region different from that of the first wavelength region light. A wavelength-selective optical film which transmits the first wavelength region light and reflects the second wavelength region light is disposed inside the optical element. The optical observation apparatus superimposes an image formed by the second wavelength region light reflected by the wavelength-selective optical film on an object image formed by the first wavelength region light transmitted through the wavelength-selective optical film to cause an observer to observe the object image with the superimposed image through the eyepiece part.

The present invention provides, according to another aspect thereof, an image-pickup apparatus including the above-described optical observation apparatus and an image-pickup element which photoelectrically converts an object image formed by the first wavelength region light.

Other aspects of the present invention will become apparent from the following description and the attached drawings.

DETAILED DESCRIPTION OF THE EMBODIMENTS

Exemplary Embodiments of the present invention will hereinafter be described with reference to the accompanying drawings.

Embodiment 1

Figure 1:
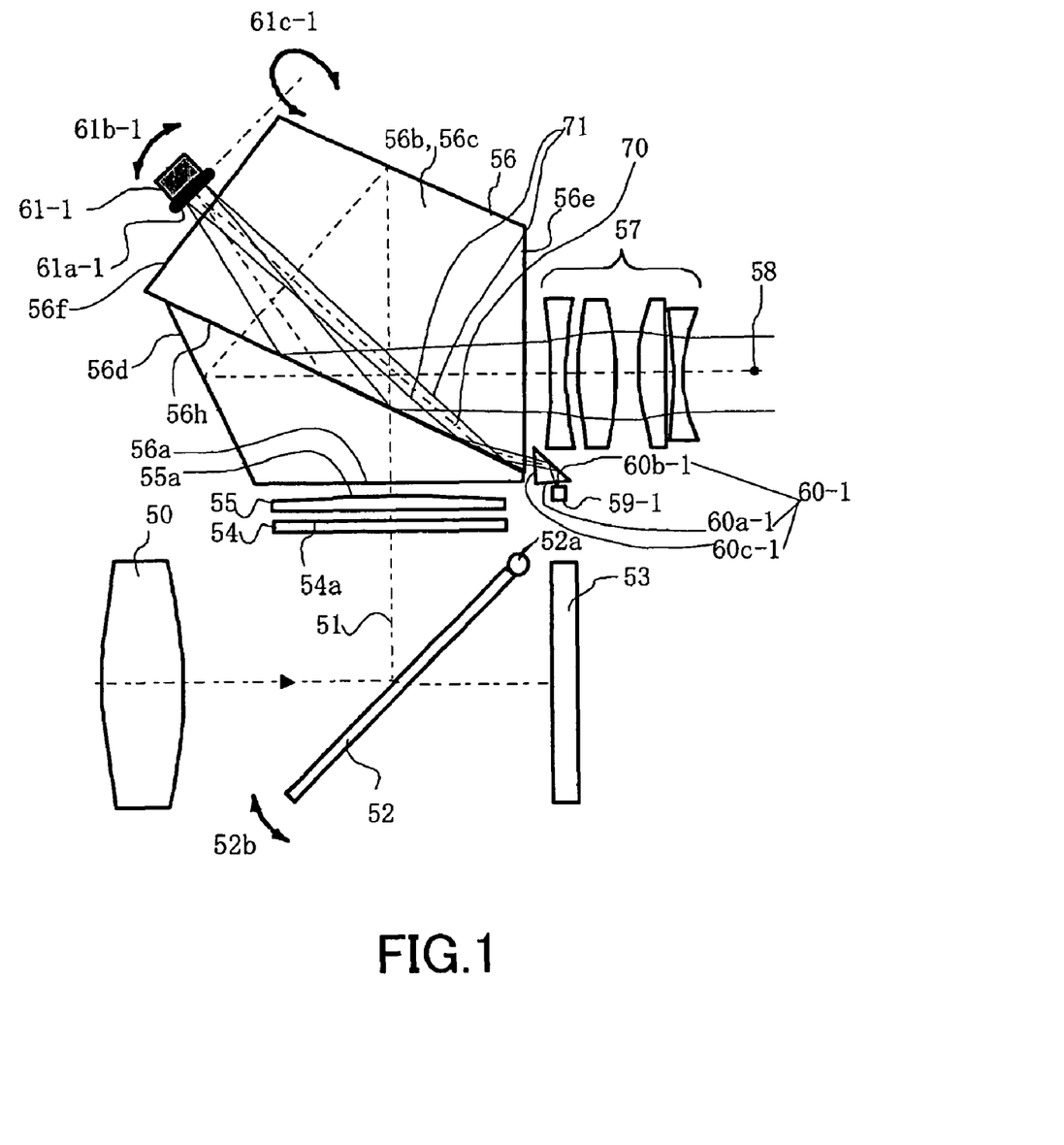
FIG. 1 is a sectional view showing a single lens reflex digital camera including an optical viewfinder which is a first embodiment (Embodiment 1) of the present invention.

FIG. 1 shows the configuration of a single lens reflex digital camera (image-pickup apparatus) including an optical viewfinder as an optical observation apparatus which is a first embodiment (Embodiment 1) of the present invention.

Referring to FIG. 1, reference numeral 50 denotes an image-pickup lens disposed in an interchangeable lens. Reference numeral 53 denotes a solid-state image-pickup element such as a CCD sensor or a CMOS sensor, which photoelectrically converts an object image formed by the image-pickup lens 50. An image processing circuit (not shown) generates an electronic image from an output signal of the image-pickup element 53. The generated electronic image is displayed on a display disposed on the backside of the camera, or recorded to a recording medium such as a semiconductor memory.

In the state shown in the figure, a light flux from an object (subject) passed through the image-pickup lens 50 forms an image on a matte surface 54*a* formed on an exit surface side of a focusing screen 54 via a movable mirror 52. Accordingly, an object image (subject image or viewfinder image) is formed on the matte surface 54*a*.

Reference numeral 51 denotes a central lay of the light flux coming from the object, passing through the image-pickup lens 50 to reach the matte surface 54*a* and then reaching an eyepiece optical system via a condenser lens and a penta-dach prism, which will be described below.

The movable mirror 52 can be moved around a rotation axis 52*a* in a direction shown by an arrow 52*b*. In other words, in a state of observing the object image through the optical viewfinder (viewfinder observation state), the movable mirror 52 is obliquely disposed in an optical path from the image-pickup lens as shown in the figure to introduce a part of the light flux from the object to the optical viewfinder. In image pickup, the movable mirror retracts out of the optical path (upward) to cause the light flux from the object to reach a light-receiving surface of the solid-state image-pickup element 53.

A condenser lens 55 is disposed above the focusing screen 54. An exit surface 55*a* of the condenser lens 55 has a convex lens shape. The condenser lens 55 projects, through an action of the convex lens (exit surface 55*a*), a pupil of the image-pickup lens 50 onto a pupil of the eyepiece optical system 57, and collects the light flux from the focusing screen 54 to efficiently introduce it to the eyepiece optical system 57.

Reference numeral 56 denotes the penta-dach prism as an optical element. The light flux from the object image formed on the matte surface 54*a* enters the penta-dach prism 56 from an entrance surface 56*a* via the condenser lens 55.

The light flux from the object that has entered the penta-dach prism 56 from the entrance surface 56*a* thereof is reflected on dach surfaces 56*b* and 56*c* and a front reflective surface 56*d* to emerge from the penta-dach prism 56 through an exit surface 56*e* thereof, and then enters the eyepiece optical system 57 which is an eyepiece part. The reflection of the light flux on the dach surfaces 56*b* and 56*c* and the front reflective surface 56*d* causes the object image formed on the matte surface 54*a* to be observed as a vertically and horizontally inverted erected image from an eyepoint 58 of the eyepiece optical system 57.

In this embodiment, the eyepiece optical system 57 is formed by four lenses. However, a configuration of the eyepiece part is not limited thereto.

This embodiment superimposes an information image for displaying various pieces of information formed by a "configuration for displaying an information image" described below on the object image (erected image inverted by the penta-dach prism) formed on the matte surface 54*a*. Thus, superimpose displaying in which the information image is seen to be superimposed on the object image in the same finder viewing field is performed. Various pieces of information include focus detection areas, photometry areas, and warning displays to a user.

A focus detection unit (not shown) is disposed below the camera. In the viewfinder observation state, a sub-mirror (not shown) is disposed at the backside of the movable mirror 52. A light flux transmitted through the movable mirror 52 is reflected on the sub-mirror to be introduced to the focus detection unit.

Next, the "configuration for displaying an information image" is described. Reference numeral 59-1 denotes a light source, for which a light emitting diode (LED) is used.

Reference numeral 60-1 denotes a reflective prism, which bends a light flux from the light source 59-1 toward the exit surface 56*e* of the penta-dach prism 56. The light flux that has entered the reflective prism 60-1 from an entrance surface 60*a*-1 thereof is reflected on a reflective surface 60*b*-1 thereof to change its direction, and then emerges from the reflective prism 60-1 through an exit surface 60*c*-1 thereof to be introduced to the exit surface 56*e* of the penta-dach prism 56.

The penta-dach prism 56 is constituted of an optical element divided into two at a surface 56*h*. A wavelength-selective optical film is deposited on a divided surface (surface of one of the two optical elements). This configuration enables formation of the wavelength-selective optical film inside the penta-dach prism 56 (optical element). Hereinafter, this wavelength-selective optical film will be referred to as the wavelength-selective film denoted by reference numeral 56*h*.

The wavelength-selective film 56*h* has a characteristic of reflecting, in a visible light wavelength region, a light flux (first wavelength region light, hereinafter a first light flux) of a wavelength region longer than a specific wavelength, and transmitting a light flux (second wavelength region light, hereinafter a second light flux) of a wavelength region shorter than the specific wavelength. In other words, the wavelength-selective film 56*h* has a characteristic similar to that of a dichroic film. The wavelength-selective film 56*h* is formed of a dielectric multilayer film.

The wavelength region shorter than the specific wavelength is a wavelength region near a center of the visible light region, which corresponds to a wavelength region of the light flux from the object. The wavelength region longer than the specific wavelength is a wavelength region longer than the wavelength region near the center of the visible light region. However, these definitions are only examples. The wavelength regions of the first and second light fluxes may only be different from each other, and they can be arbitrarily selected.

The wavelength-selective film 56*h* transmits the first light flux from the focusing screen 54 (that is, from the object) having entered the penta-dach prism 56 through the entrance surface 56*a* and proceeding to the dach surfaces 56*b* and 56*c*. The wavelength-selective film 56*h* reflects the second light flux from the light source 59-1 having entered the penta-dach prism 56 through the exit surface 56*e* to introduce it toward a front upper surface 56*f* of the penta-dach prism 56.

A reflective member 61-1 is disposed at a position facing the front upper surface 56*f* outside the penta-dach prism 56. The second light flux reflected by the wavelength-selective film 56*h* is transmitted through the front upper surface 56*f* to emerge from the penta-dach prism 56, thereby reaching the reflective member 61-1. The second light flux that has reached the reflective member 61-1 is reflected on its reflective surface 61*a*-1 to proceed again to the front upper surface 56*f* of the penta-dach prism 56.

The reflective member 61-1 is rotated around an axis vertical to the paper plane of FIG. 1 in a direction 61*b*-1. The reflective member 61-1 is also rotated around an axis parallel to the paper plane of FIG. 1 in a direction 61*c*-1. In other words, the reflective member 61-1 can be rotated around the two axes orthogonal to each other. Accordingly, the second light flux emitted from the light source 59-1 and reflected on the reflective surface 61*a*-1 can be scanned two-dimensionally.

Reference numeral 70 denotes a central ray of the second light flux emitted from the light source 59-1 to reach an eyepoint 58, and reference numeral 71 denotes diffusion of the second light flux.

The object image formed on the matte surface 54a of the focusing screen 54 is, as described above, introduced through the dach surfaces 56b and 56c and the front reflective surface 56d to the eyepiece optical system 57. In other words, the front upper surface 56f of the penta-dach prism 56 is a surface on or through which the first light flux from the object is not reflected nor transmitted, or a surface not used by the first light flux.

This embodiment uses the front upper surface 56f of the penta-dach prism 56, which is not used by the first light flux from the object, as an exit surface to the reflective member 61-1 and an entrance surface from the reflective member 61-1, thereby enabling effective use of the front upper surface 56f of the penta-dach prism 56.

For the reflective member 61-1 capable of biaxial rotation around the two axes, a galvano mirror often used for an image-forming apparatus such as a copying machine or a laser beam printer can be used. The galvano mirror is a device which can control a rotational angle of a mirror based on current control by using the principle of driving a galvanometer. For the reflective member 61-1, a MEMS mirror device may be used which can resonantly swing a mirror surface and is included in micro electro-mechanical system (MEMS) devices manufactured by using a semiconductor technology.

This embodiment employs the configuration of forming a two-dimensional image on a retina of the user (observer), not shown), by controlling a luminance tone or turning ON/OFF of the light source 59-1 in synchronization with two-dimensional scanning of the reflective member 61-1. The scanning control of the reflective member 61-1 enables the user to observe an optional pattern image. Thus, freedom of contents (display contents) of information to be provided to the user can be greatly increased. Changing of a scanning control program facilitates changing of the display contents.

The second light flux reflected by the reflective member 61-1 to reenter (return to) the penta-dach prism 56 from the front upper surface 56f proceeds again to the wavelength-selective film 56h, and is reflected again thereon to proceed to the exit surface 56e of the penta-dach prism 56. The second light flux that has emerged from the penta-dach prism 56 through the exit surface 56e thereof is introduced to the eyepiece optical system 57, similarly to the first light flux from the focusing screen 54. As described above, the second light flux from the light source 59-1 is reflected twice on the wavelength-selective film 56h in the penta-dach prism 56 to be introduced to the eyepiece optical system 57.

Accordingly, the user can observe a superimpose display image in which an information image formed by the luminance tone control of the light source 59-1 and the light flux scanning by the reflective member 61-1 is superimposed on the object image formed on the matte surface 54a of the focusing screen 54.

The light source 59-1 is disposed at a position optically equivalent to that of the matte surface 54a of the focusing screen 54. Accordingly, when the user looks into the viewfinder from the eyepoint 58 through the eyepiece optical system 57, the user can see the information image at the position optically equivalent to that of the matte surface 54a of the focusing screen 54. Thus, the user can simultaneously observe the object image and the information image which are in-focus.

This embodiment enables shortening of an optical path of the viewfinder since an optical combining member similar to that disclosed in Japanese Patent Laid-Open No. 10-228057 is not disposed between the penta-dach prism 56 and the eyepiece optical system 57. As a result, a deterioration of viewfinder performance such as a reduction of the magnification of the viewfinder can be prevented. Thus, good superimpose displaying of the object image and the information image can be provided, and the viewfinder performance can be improved.

Figure 2:
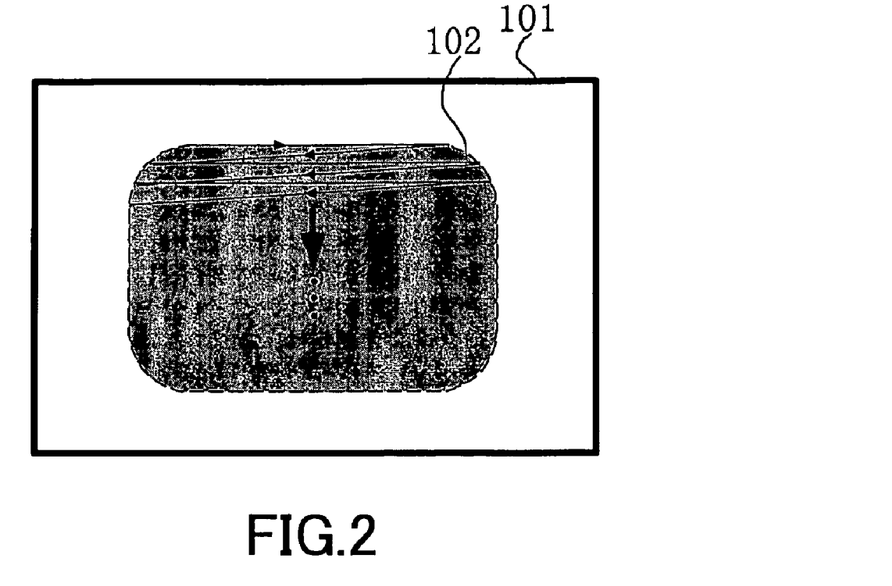
FIG. 2 shows a light flux scanning method in the optical viewfinder of Embodiment 1.

FIG. 2 shows a situation in which when making observation from the eyepoint 58 through the eyepiece optical system 57, the user sees the information image at the position optically equivalent to that of the matte surface 54a of the focusing screen 54.

Referring to FIG. 2, reference numeral 101 denotes a finder viewing field (region in which the object image is seen), and reference numeral 102 denotes a display region of the information image. Suppose, for example, in FIG. 1, the reflective member 61-1 can scan the second light flux from the light source 59-1 by about 4 degrees in the direction 61c-1 and by about 3 degrees in the direction 61b-1. In this case, when the second light flux is scanned at 28.8 KHz in the direction 61c-1 and at 60 Hz in the direction 61b-1, the information image display region 102 is scanned with 480 scanning lines, and this scanning is repeated 60 times per second.

In this case, if the light source 59-1 is always lit, the information image display region 102 is observed to be uniformly bright.

However, synchronization of the scanning operation of the reflective member 61-1 with the control of emission intensity (control of the luminance tone and the turning ON/OFF) enables displaying of an optional pattern within the information image display region 102.

Figure 3:
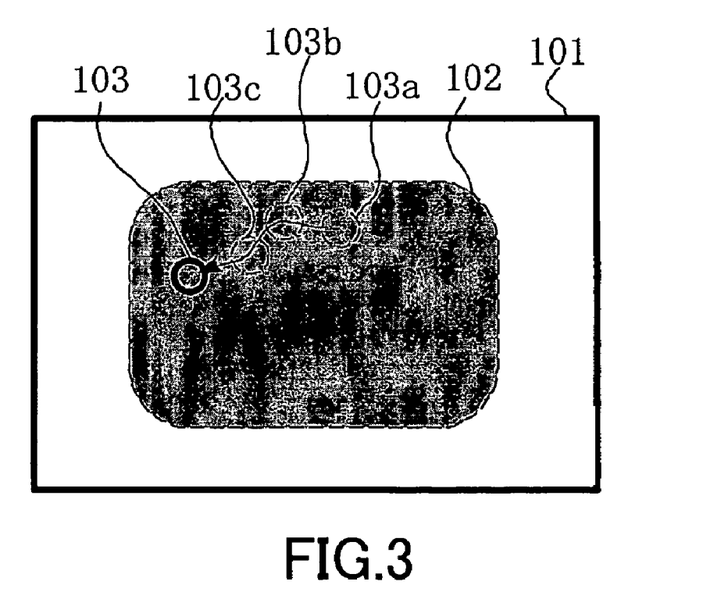
FIG. 3 shows a display example in a finder viewing field of the optical viewfinder of Embodiment 1.

FIG. 3 shows a situation in which an information image of an optional pattern is displayed within the information image display region 102. As an example of the information image, a focus detection area 103 is shown where focus detection for AF is performed and which continuously moves within the information image display region 102 due to camera panning by the user pursuing the object moving in a horizontal direction. The camera panning may lag behind the moving object or move up and down. In such a case, the position of the object in the finder viewing field 101 varies, so that the focus detection area 103 pursuing the object also moves.

Different from the case disclosed in Japanese Patent Laid-Open No. 7-244317 where only a fixed pattern can be displayed, this embodiment can display optional patterns and therefore can display the focus detection area 103 continuously moving in a manner of 103a→103b→103c→103. Thus, this embodiment enables the user to observe even a moving information image without any uncomfortable feeling.

Figure 4:
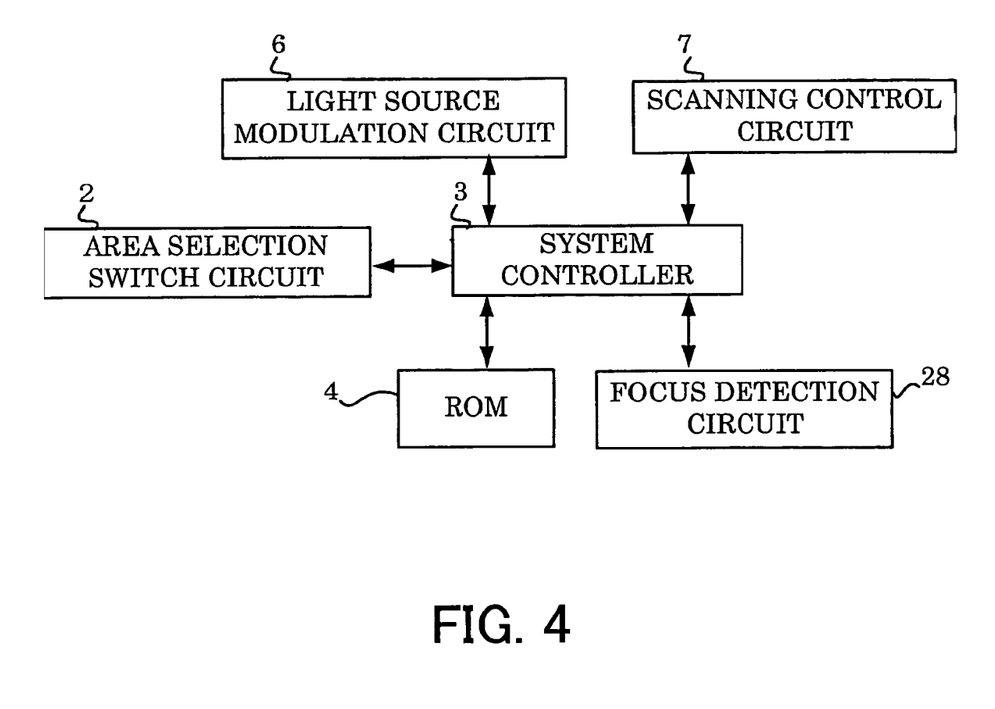
FIG. 4 is a block diagram showing an electric configuration of Embodiments 1 and 2.

FIG. 4 shows the electric configuration for displaying the information image and its related circuit in this embodiment.

Referring to FIG. 4, reference numeral 28 denotes a focus detection circuit which performs the focus detection of the image-pickup lens 50 by a phase-difference detection method at plural focus detection areas set in the finder viewing field corresponding to an image pickup region.

The focus detection unit causes a light flux from the image-pickup lens 50 to form plural pairs of images. The focus detection circuit 28 uses plural pairs of line sensors which receive the plural pairs of images to output phase-difference signals each indicating a phase difference between the output signals from each pair of line sensors.

Reference numeral 2 denotes an area selection switch circuit which is operated by the user to select one of the plural focus detection areas at which the user desires that the focus detection is performed.

Reference numeral 6 denotes a light source modulation circuit which controls the luminance tone or the turning ON/OFF of the light source 59-1 for displaying the selected focus detection area or various warning displays to the user in the viewfinder. Reference numeral 7 denotes a scanning control circuit which two-dimensionally rotates the reflective member 61-1 to cause the reflective member 61-1 to scan the light flux from the light source 59-1.

Reference numeral 3 denotes a system controller which calculates a defocus amount in the focus detection area selected by the area selection switch circuit 2 based on the phase-difference signal from the focus detection circuit 28. The system controller 3 performs focusing of the image-pickup lens 50 based on the defocus amount. The system controller 3 controls the light source modulation circuit 6 and the scanning control circuit 7 to superimposedly display the selected focus detection area.

Reference numeral 4 denotes a ROM which stores correction values for correcting tone fluctuation of the information image and drive fluctuation of the reflective member 61-1. The system controller 3 controls the light source modulation circuit 6 and the scanning control circuit 7 based on the correction values read from the ROM 4 while correcting control signals to be output to the same. Thus, an information image that can be easily seen can be formed in the viewfinder. This electric configuration is similar in Embodiment 2 described below.

As described above, this embodiment can provide the optical viewfinder which enables the observer (user) to observe an optional information image superimposed on the object image without a deterioration of viewfinder performance.

Embodiment 2

Embodiment 1 has been described the case in which the light flux (second light flux) from the light source 59-1 is two-dimensionally scanned by the reflective member 61-1 to form the information image.

Figure 5:
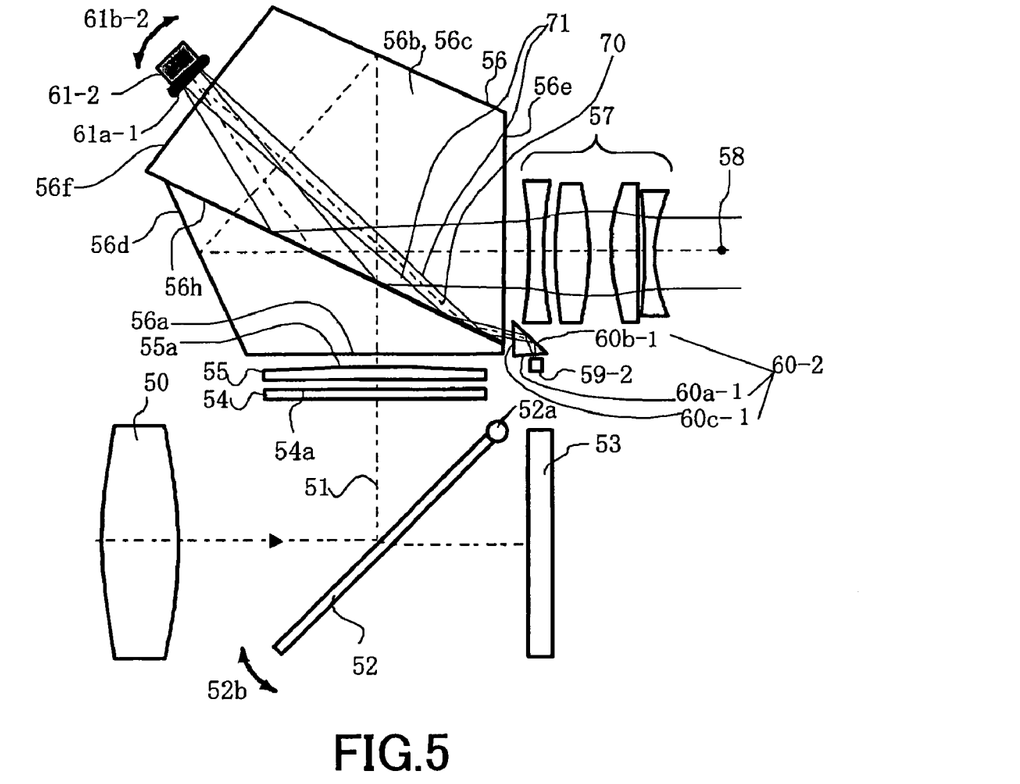
FIG. 5 is a sectional view showing a single lens reflex digital camera including an optical viewfinder which is a second embodiment (Embodiment 2) of the present invention.

An optical viewfinder of a second embodiment (Embodiment 2) of the present invention shown in FIG. 5 uses as a light source a light source array 59-2 constituted of plural light sources (LEDs) which are one-dimensionally arranged in a direction vertical to the paper plane of FIG. 5.

A light flux (second light flux) from the light source array 59-2 is reflected and scanned by a reflective member 61-2 one-dimensionally rotated around an axis vertical to the paper plane of FIG. 5 in a direction 61*b*-2. This embodiment can use a galvano mirror or a MEMS mirror device as the reflective member 61-2.

The use of the light source array 59-2 enables high-resolution displaying in the direction in which the plural light sources are arranged. The light flux from the light source array 59-2 is reflected by a wavelength-selective film 56*h* and the reflective member 61-2, and then scanned in a one-dimensional direction by the reflective member 61-2 to be introduced to an eyepiece optical system 57. Thus, an information image of an optional pattern can be displayed.

The optical viewfinder of this embodiment has a configuration similar to that of the optical viewfinder of Embodiment 1 except for the light source array 59-2, the reflective member 61-2, and a reflective prism 60-2. Thus, components identical to those of Embodiment 1 are denoted by the same reference numerals as those in Embodiment 1, and description thereof is omitted.

Surfaces (entrance surface, reflective surface, and exit surface) of the reflective member 61-2 and the reflective prism 60-2 having functions identical to those of the reflective member 61-1 and the reflective prism 60-1 of Embodiment 1 are denoted by the same reference numerals as those of the Embodiment 1, and description will be omitted.

An optical path of a first light flux from an object and an optical path of the second light flux emitted from the light source array 59-2 to form the information image in this embodiment are similar to those in Embodiment 1, and thus description thereof is omitted.

In this embodiment, the light source array 59-2 and the reflective prism 60-2 extend thin and long in a direction vertical to the paper plane of FIG. 5. In a camera of this embodiment, while there is not much space room around the lower side of an exit surface 56*e* of a penta-dach prism 56 in an emerging direction of the light flux (optical axis direction of the eyepiece optical system 57) and in a vertical direction, there is some space room in the direction vertical to the paper plane of FIG. 5.

The reason for this is that it is necessary to dispose the eyepiece optical system 57 at a position adjacent to the exit surface 56*e* of the penta-dach prism 56 and dispose a shutter unit (not shown) at a position above the eyepiece optical system 57. Therefore, it is extremely difficult to dispose, near the exit surface 56*e* of the penta-dach prism 56, a member extending in the optical axis direction of the eyepiece optical system 57 or in the vertical direction.

In this regard, according to this embodiment, the light source array 59-2 and the reflective prism 60-2 thin and long are arranged in the direction vertical to the paper plane of FIG. 5 in which some space room exists around the lower side of the exit surface 56*e* of the penta-dach prism 56. Thus, the camera can be prevented from being enlarged by effectively using the space in the camera.

The use of the light source array 59-2 in which the plural light sources are one-dimensionally arranged enables one-dimensional scanning of the light flux by the reflective member 61-2. As a result, as compared with the case of two-dimensionally scanning the light flux, a driving speed of the reflective member 61-2 can be reduced.

Figure 6:
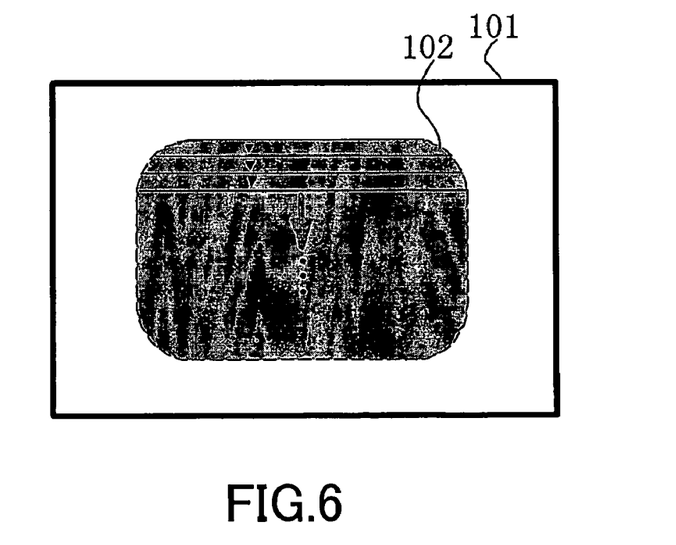
FIG. 6 shows a light flux scanning method in the optical viewfinder of Embodiment 2.

FIG. 6 shows a situation in which the information image is seen at a position optically equivalent to that of a matte screen 54*a* of a focusing screen 54 when a user makes observation from an eyepoint 58 through the eyepiece optical system 57.

Referring to FIG. 6, there is a display region 102 of an information image in a finder viewing field (region in which an object image is seen) 101. Suppose, for example, in FIG. 5, the reflective member 61-2 can scan the second light flux from the light source array 59-2 constituted of 350 LEDs by about 3 degrees in a direction 61*b*-2. In this case, when the second light flux is scanned at 60 Hz in the direction 61*b*-2, the information image display region 102 is scanned with 480 scanning lines, and this operation is repeated 60 times per second.

In this case, if all the light sources of the light source array 59-2 are always lit, the information image display region 102 can observed to be uniformly bright.

In this embodiment, however, the system controller 3 shown in FIG. 4 performs, through the scanning control circuit 7 and the light source modulation circuit 6, control of the light source array 59-2 such that the light source array 59-2 lights in synchronization with the scanning operation of the reflective member 61-2 and the emission intensity of the light source array 59-2. This enables displaying of an optional pattern within the information image display region 102.

As in the case of Embodiment 1, this embodiment can provide the optical viewfinder which enables the observer (user) to observe an optional information image superimposed on the object image without a deterioration of viewfinder performance.

Embodiment 3

Embodiments 1 and 2 have been described the case in which the light flux (second light flux) from the light source 59-1 or 59-2 is scanned by the reflective members 61-1 or 61-2 to form the information image.

Figure 7:
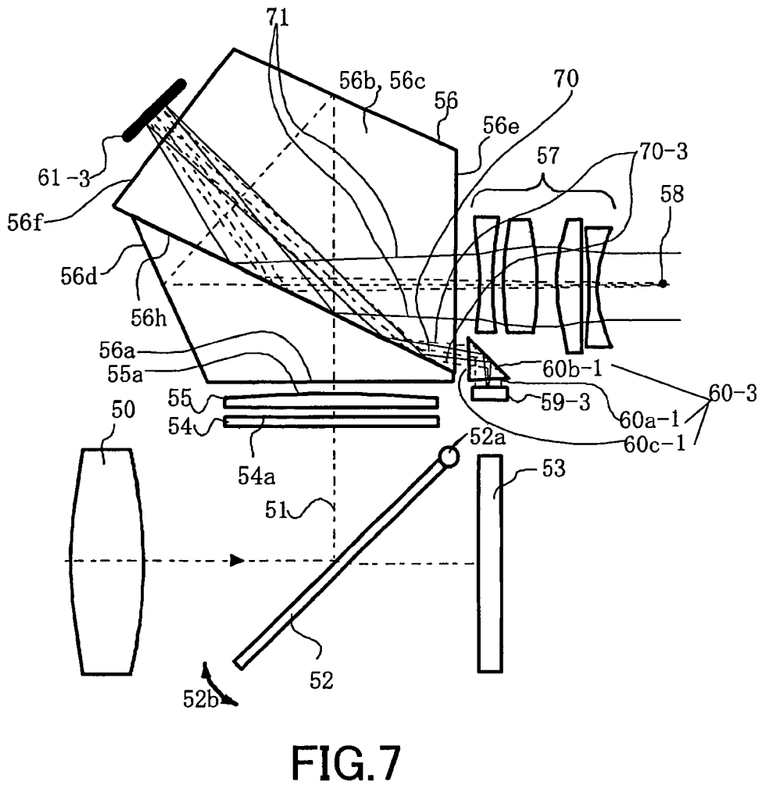
FIG. 7 is a sectional view showing a single lens reflex digital camera including an optical viewfinder which is a third embodiment (Embodiment 3) of the present invention.

In contrast, an optical viewfinder which is a third embodiment (Embodiment 3) of the present invention shown in FIG. 7 uses as a light source a dot matrix light source 59-3 in which plural light sources (LEDs) are two-dimensionally arranged. A reflective member 61-3 is a fixed mirror which does not scan a light flux.

The use of the dot matrix light source 59-3 enables high-resolution displaying in a two-dimensional direction in which the plural light sources are arranged. A light flux from the dot matrix light source 59-3 is reflected by a wavelength-selective film 56h and the reflective member 61-3 to be introduced to an eyepiece optical system 57. Thereby, an information image of an optional pattern can be displayed.

The optical viewfinder of this embodiment has a configuration similar to that of the optical viewfinder of Embodiment 1 except for the dot matrix light source 59-3, the reflective member 61-3, and a reflective prism 60-3. Thus, components identical to those in Embodiment 1 are denoted by the same reference numerals, and description thereof is omitted.

Surfaces (entrance surface, reflective surface, and exit surface) of the reflective prism 60-3 having the same function as those of the reflective prism 60-1 in Embodiment 1 are denoted by the same reference numerals as those in Embodiment 1, and description thereof is omitted.

An optical path of a first light flux from an object and an optical path of a second light flux emitted from the dot matrix light source 59-3 to form an information image in this embodiment are basically the same as those of Embodiment 1 except for no scanning of the second light flux, and thus description thereof is omitted.

The electric configuration of this embodiment is the same as that shown in FIG. 4 after the scanning control circuit 7 is removed.

In the dot matrix light source 59-3 used in this embodiment, directions in which the plural light sources are arranged are a direction vertical to the paper plane of FIG. 7 and a direction (horizontal direction) parallel thereto. Especially, as described in Embodiment 2, space room is larger in the direction vertical to the paper plane of FIG. 7, and thus the number of light sources arranged in this direction can be larger than that in the horizontal direction. Accordingly, the number of pixels for displaying the information image can be increased by effectively using the space in the camera.

The use of the dot matrix light source 59-3 in which the plural light sources are arranged eliminates the necessity of driving the reflective member 61-3 to scan the light flux. Thus, the configuration of the optical viewfinder can be simplified.

Figure 8:
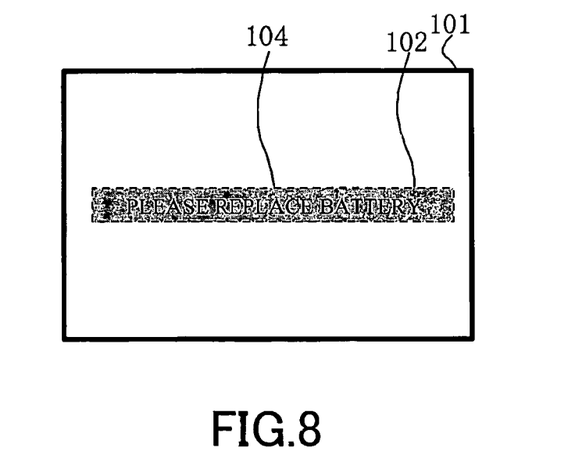
FIG. 8 shows a display example in a finder viewing field of the optical viewfinder of Embodiment 3.

FIG. 8 shows a situation in which when making observation from an eyepoint 58 through the eyepiece optical system 57, a user sees the information image at a position optically equivalent to a matte surface 54a of a focusing screen 54.

Referring to FIG. 8, there is a display region 103 of an information image in a finder viewing field (region in which an object image is seen) 101. Since the dot matrix light source 59-3 and the reflective prism 60-3 are spread in the direction vertical to the paper plane of FIG. 7, the display region 102 of the information image extends long in the horizontal direction. Controlling the turning ON/OFF of each light source in the dot matrix light source 59-3 by a system controller 3 through a light source modulation circuit enables displaying of an optional pattern.

FIG. 8 shows an example in which a battery warning 104 to prompt replacement because of a reduced remaining amount of a battery is displayed to the user.

As Embodiments 1 and 2, this embodiment can provide the optical viewfinder which enables the observer (user) to observe an optional information image superimposed on an object image without a deterioration of viewfinder performance.

According to each of Embodiments 1 to 3, the wavelength-selective optical film is disposed inside the optical element such as a penta-dach prism, and the information image is superimposed on the object image formed by the light having a wavelength region different from that of the light forming the information image by using transmission and reflection by the optical film. Thus, an optical observation apparatus can be realized which enables an observer to observe an optional information image superimposed on the object image without a deterioration of viewfinder performance.

Furthermore, the present invention is not limited to these Embodiments and various variations and modifications may be made without departing from the scope of the present invention.

For example, each of the embodiments has been described the case in which the light flux from the light source is reflected by the wavelength-selective film and the reflective member to be introduced to the eyepiece optical system. However, without disposing any reflective member, the light flux may be reflected only by the wavelength-selective film to be introduced to the eyepiece optical system. The number of reflection times at the wavelength-selective film may be other than two.

Each of the embodiments has been directed to the optical viewfinder mounted on the single lens reflex digital camera. However, an alternative embodiment of the present invention includes an optical observation apparatus such as a binocular or a telescope.

This application claims the benefit of Japanese Patent Application No. 2007-165644, filed on Jun. 22, 2007, which is hereby incorporated by reference herein in its entirety.

What is claimed is:

1. An optical observation apparatus comprising:
   penta-dach prism which reflects a first wavelength region light which has passed through a focusing screen from an object to introduce the light to an eyepiece part; and
   a light source which is disposed at a position optically equivalent to the focusing screen and emits a second wavelength region light that is light in a wavelength region different from that of the first wavelength region light,
   wherein a wavelength-selective optical film which transmits the first wavelength region light and reflects the second wavelength region light is disposed inside the penta-dach prism, and
   wherein the optical observation apparatus superimposes an image formed by the second wavelength region light reflected by the wavelength-selective optical film on an object image formed by the first wavelength region light transmitted through the wavelength-selective optical film to cause an observer to observe the object image with the superimposed image through the eyepiece part.

2. An optical observation apparatus according to claim 1, further comprising a reflective member which reflects the second wavelength region light emitted from the light source and then reflected by the wavelength-selective optical film, and causes the second wavelength region light to proceed again to the wavelength-selective optical film, wherein the optical observation apparatus superimposes the image formed by the second wavelength region light reflected by the reflective member and then reflected again by the wavelength-selective optical film on the object image formed by the first wavelength region light transmitted through the wavelength-selective optical film to cause the observer to observe the object image with the superimposed image through the eyepiece part.

3. An optical observation apparatus according to claim 2, wherein the reflective member reflects the second wavelength region light which has emerged from the penta-dach prism through a surface not used by the first wavelength region light among surfaces of the penta-dach prism to return the second wavelength region light into the penta-dach prism.

4. An optical observation apparatus according to claim 2, wherein the light source causes the second wavelength region light to enter the penta-dach prism from a surface of the penta-dach prism through which the first wavelength region light and the second wavelength region light emerge from the penta-dach prism toward the eyepiece part.

5. An optical observation apparatus according to claim 2, wherein the reflective member is driven to scan the second wavelength region light.

6. An image-pickup apparatus comprising:
an optical observation apparatus according to claim 1; and
an image-pickup element which photoelectrically converts an object image formed by the first wavelength region light.

* * * * *